United States Patent
Oka

(10) Patent No.: US 11,549,735 B2
(45) Date of Patent: Jan. 10, 2023

(54) APPARATUS, METHOD, AND PROGRAM FOR ESTIMATING AMOUNT OF REFRIGERANT

(71) Applicant: DAIKIN INDUSTRIES, LTD., Osaka (JP)

(72) Inventor: Yuusuke Oka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/593,292

(22) PCT Filed: Feb. 26, 2020

(86) PCT No.: PCT/JP2020/007757
§ 371 (c)(1),
(2) Date: Sep. 15, 2021

(87) PCT Pub. No.: WO2020/189203
PCT Pub. Date: Sep. 24, 2020

(65) Prior Publication Data
US 2022/0146169 A1 May 12, 2022

(30) Foreign Application Priority Data
Mar. 19, 2019 (JP) .............................. JP2019-052020

(51) Int. Cl.
*F25B 49/02* (2006.01)
*F25B 39/00* (2006.01)
*F25B 40/02* (2006.01)

(52) U.S. Cl.
CPC .............. *F25B 49/02* (2013.01); *F25B 39/00* (2013.01); *F25B 40/02* (2013.01);
(Continued)

(58) Field of Classification Search
CPC .......... F25B 49/02; F25B 39/00; F25B 40/02; F25B 2400/0417; F25B 2500/19; F25B 2700/04
See application file for complete search history.

(56) References Cited

U.S. PATENT DOCUMENTS 9,222,711 B2 12/2015 Ochiai et al.
2012/0180506 A1 7/2012 Ochiai et al.
(Continued)

FOREIGN PATENT DOCUMENTS

CN 102575889 7/2012
EP 3348939 7/2018
(Continued)

OTHER PUBLICATIONS

International Search Report dated Apr. 7, 2020, issued to PCT/JP2020/007757.
(Continued)

*Primary Examiner* — Henry T Crenshaw
(74) *Attorney, Agent, or Firm* — IPUSA, PLLC

(57) ABSTRACT

A refrigerant amount inference apparatus infers a refrigerant amount in an air conditioner in which a compressor, a heat source side heat exchanger, a supercooling heat exchanger, a pressure reducing valve, and a use side heat exchanger are connected to piping. The supercooling heat exchanger exchanges heat between refrigerant that passes through a valve provided in a bypass circuit and refrigerant in a mainstream circuit. The refrigerant amount inference apparatus includes an acquiring unit that acquires a state of refrigerant in first piping provided between the pressure reducing valve and the supercooling heat exchanger and an operation amount related to the state of the refrigerant in the first piping, and a training unit that performs training by associating the state of the refrigerant in the first piping and
(Continued)

the operation amount related to the state of the refrigerant in the first piping with a refrigerant amount.

7 Claims, 8 Drawing Sheets

(52) U.S. Cl.
CPC ... *F25B 2400/0417* (2013.01); *F25B 2500/19* (2013.01); *F25B 2700/04* (2013.01)

(56) References Cited

U.S. PATENT DOCUMENTS

2019/0078818 A1* 3/2019 Khaled ................... F25B 41/34
2020/0003467 A1* 1/2020 Noor ....................... F25B 49/02

FOREIGN PATENT DOCUMENTS

| JP | 2005-257219 | 9/2005 |
| JP | 2006-292213 | 10/2006 |
| JP | 2008-249234 | 10/2008 |
| JP | 2012-047364 | 3/2012 |
| JP | 2017-053566 | 3/2017 |
| JP | 2019-035579 | 3/2019 |

OTHER PUBLICATIONS

International Preliminary Report on Patentability for PCT/JP2020/007757 dated Sep. 30, 2021.
Extended European Search Report dated Apr. 20, 2022 with respect to the corresponding European patent application No. 20774743.7.

* cited by examiner

FIG.6

| STATE OF REFRIGERANT IN FIRST PIPE (DEGREE OF SUPERCOOLING) | OPERATION AMOUNT RELATED TO REFRIGERANT AMOUNT IN FIRST PIPE (OPERATION AMOUNT OF SUPERCOOLING BYPASS EXPANSION VALVE) | ... | REFRIG-ERANT AMOUNT |
|---|---|---|---|
| **** | **** | ... | *** |
| **** | **** | ... | *** |
| **** | **** | ... | *** |
| **** | **** | ... | *** |
| **** | | | |

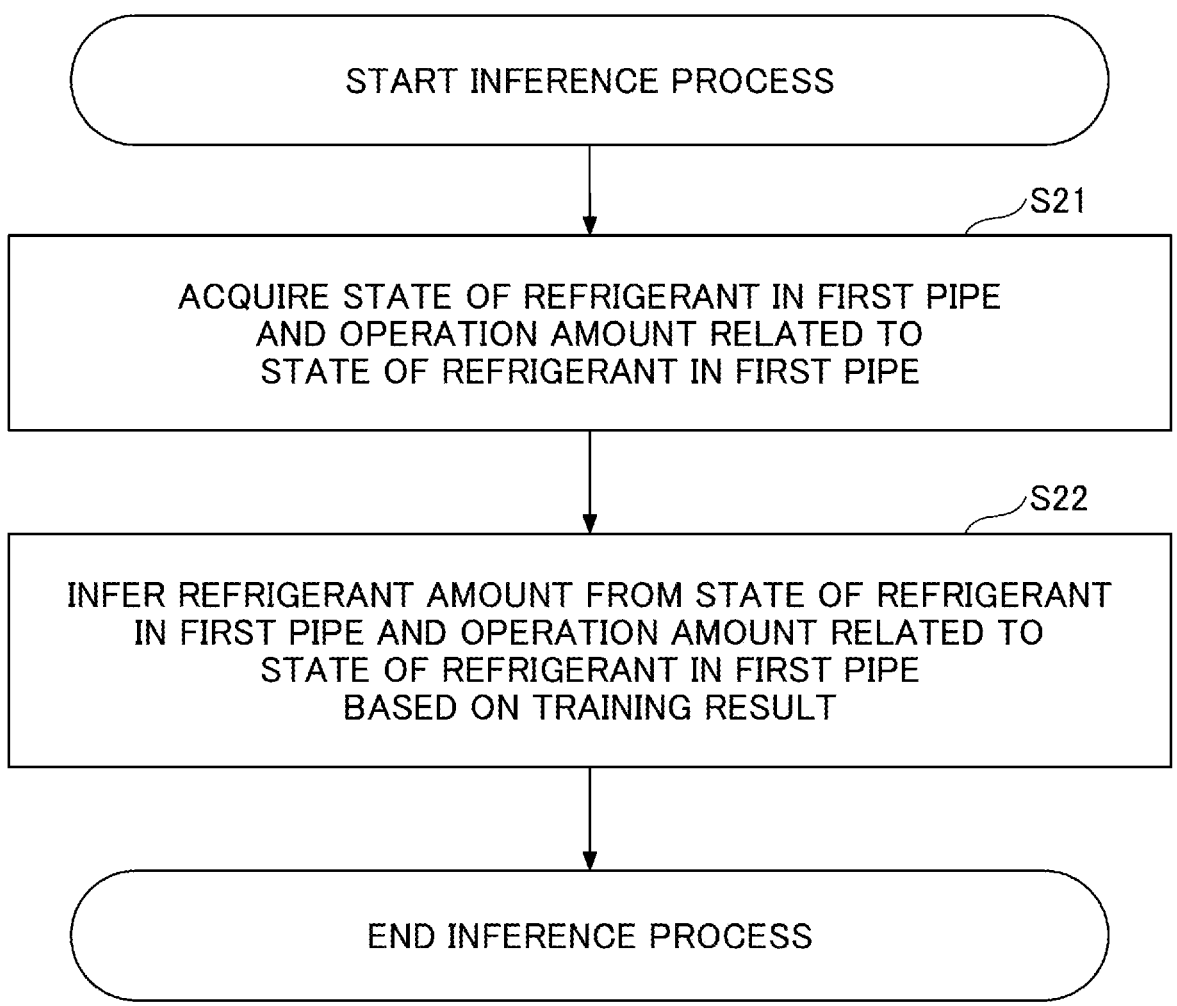

APPARATUS, METHOD, AND PROGRAM FOR ESTIMATING AMOUNT OF REFRIGERANT

TECHNICAL FIELD

The present disclosure relates to an apparatus, a method, and a program for inferring an amount of refrigerant.

BACKGROUND ART

Conventionally, a refrigeration cycle apparatus having a refrigerant amount determination function is disclosed. In Patent Document 1, a state quantity of the refrigerant at a certain time and a state quantity of the refrigerant after a certain operation amount is applied to the state quantity are measured, and the amount of the refrigerant is determined according to whether a change corresponding to the operation amount is reflected in the state quantity (Patent Document 1 paragraph [0025]).

RELATED ART DOCUMENT

Patent Document

[Patent Document 1] Japanese Laid-open Patent Publication No. 2012-47364

SUMMARY OF THE INVENTION

Problem to be Solved by the Present Disclosure

However, in Patent Document 1, in order to accurately determine the amount of the refrigerant, estimated values of parameters of an Autoregressive exogenous model (ARX model) must be identified. The present disclosure is intended to facilitate the determination of the amount of the refrigerant.

Means for Solving Problem

A refrigerant amount inference apparatus according to a first aspect of the present disclosure infers a refrigerant amount in an air conditioner in which a compressor, a heat source side heat exchanger, a supercooling heat exchanger, a pressure reducing valve, and a use side heat exchanger are connected to piping. The supercooling heat exchanger is a heat exchanger that exchanges heat between refrigerant that passes through a supercooling bypass expansion valve provided in a bypass circuit and refrigerant in a mainstream circuit. The bypass circuit is connected to piping on a suction side of the compressor from a position between the heat source side heat exchanger and the supercooling heat exchanger, or from a position between the pressure reducing valve and the supercooling heat exchanger. The refrigerant amount inference apparatus includes an acquiring unit configured to acquire a state of refrigerant in first piping provided between the pressure reducing valve and the supercooling heat exchanger and an operation amount related to the state of the refrigerant in the first piping, and a training unit configured to perform training by associating the state of the refrigerant in the first piping and the operation amount related to the state of the refrigerant in the first piping with a refrigerant amount.

According to the first aspect of the present disclosure, the refrigerant amount inference apparatus that performs training by associating the state of the refrigerant in the first piping and the operation amount related to the state of the refrigerant in the first piping with the refrigerant amount can be provided.

Additionally, a second aspect of the present disclosure includes an inference unit that infers a refrigerant amount from a state of the refrigerant in the first piping and the operation amount related to the state of the refrigerant in the first piping, based on a result of the training performed by the training unit.

Additionally, a third aspect of the present disclosure includes an inference unit that infers whether the refrigerant amount is appropriate from the state of the refrigerant in the first piping and the operation amount related to the state of the refrigerant in the first piping, based on a result of the training performed by the training unit.

Additionally, according to a fourth aspect of the present disclosure, the state of the refrigerant in the first piping is a current value of the degree of supercooling or both the current value and a pre-change value of the degree of supercooling, and the operation amount related to the state of the refrigerant in the first piping is a current value of the operation amount of the supercooling bypass expansion valve, or the current value or a pre-change value of the operation amount of the supercooling bypass expansion valve.

Additionally, according to a fifth aspect of the present disclosure, the training unit further inputs a condenser refrigerant state and an operation amount related to the condenser refrigerant state, and performs the training by associating the state of the refrigerant in the first piping, the operation amount related to the state of the refrigerant in the first piping, the condenser refrigerant state, and the operation amount related to the condenser refrigerant state with the refrigerant amount.

Additionally, according to a sixth aspect of the present disclosure, the training unit further inputs an evaporator refrigerant state and an operation amount related to the evaporator refrigerant state, and performs the training by associating the state of the refrigerant in the first piping, the operation amount related to the state of the refrigerant in the first piping, the evaporator refrigerant state, and the operation amount related to the evaporator refrigerant state with the refrigerant amount.

Additionally, according to a seventh aspect of the present disclosure, the state of the refrigerant in the first piping, the operation amount related to the state of the refrigerant in the first piping, and the refrigerant amount are initial data at the time of installation of the air conditioner or design data at the time of development of the air conditioner.

Additionally, a method according to an eighth aspect of the present disclosure is a method performed by a computer that infers a refrigerant amount in an air conditioner in which a compressor, a heat source side heat exchanger, a supercooling heat exchanger, a pressure reducing valve, and a use side heat exchanger are connected to piping. The supercooling heat exchanger is a heat exchanger that exchanges heat between refrigerant that passes through a supercooling bypass expansion valve provided in a bypass circuit and refrigerant in a mainstream circuit. The bypass circuit is connected to piping on a suction side of the compressor from a position between the heat source side heat exchanger and the supercooling heat exchanger or from a position between the pressure reducing valve and the supercooling heat exchanger. The method includes an acquiring step of acquiring a state of refrigerant in first piping provided between the pressure reducing valve and the supercooling heat exchanger and an operation amount related to the state of the refrigerant in the first piping, and a training step of performing training by associating the state of the refrigerant in the first piping and the operation amount related to the state of the refrigerant in the first piping with a refrigerant amount.

Additionally, a program according to a ninth aspect of the present disclosure causes a computer that infers a refrigerant amount in an air conditioner in which a compressor, a heat source side heat exchanger, a supercooling heat exchanger, a pressure reducing valve, a use side heat exchanger are connected to piping, the supercooling heat exchanger being a heat exchanger that exchanges heat between refrigerant that passes through a supercooling bypass expansion valve provided in a bypass circuit and refrigerant in a mainstream circuit, the bypass circuit being connected to piping on a suction side of the compressor from a position between the heat source side heat exchanger and the supercooling heat exchanger or from a position between the pressure reducing valve and the supercooling heat exchanger, to function as a device including an acquiring unit configured to acquire a state of refrigerant in first piping provided between the pressure reducing valve and the supercooling heat exchanger and an operation amount related to the state of the refrigerant in the first piping, and a training unit configured to perform training by associating the state of the refrigerant in the first piping and the operation amount related to the state of the refrigerant in the first piping with a refrigerant amount.

BRIEF DESCRIPTION OF THE DRAWINGS

FIG. 6 is a diagram for explaining the correspondence between a state of refrigerant and an operation amount related to the state of the refrigerant; and a refrigerant amount, according to one embodiment of the present disclosure;

FIG. 8 is a flowchart of an inference process according to one embodiment of the present disclosure.

EMBODIMENT FOR CARRYING OUT THE INVENTION

In the following, an embodiment of the present disclosure will be described with reference to the drawings.

<Overall Configuration (a Bypass Example 1)>

Figure 1:
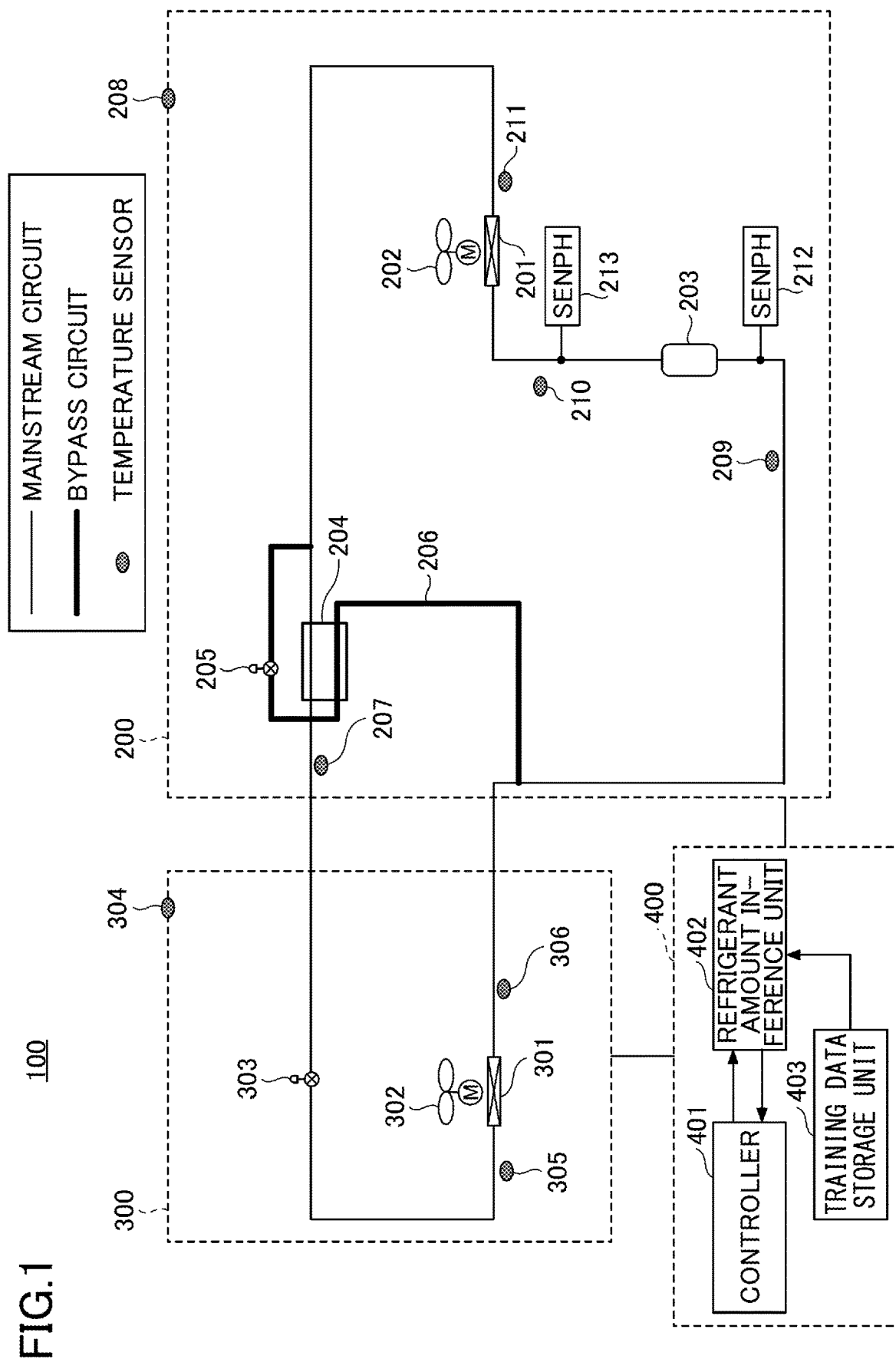
FIG. 1 is a diagram illustrating an overall configuration according to one embodiment of the present disclosure.

FIG. 1 is a diagram illustrating an overall configuration (a bypass example 1) according to one embodiment of the present disclosure. An air conditioner 100 includes an outdoor unit 200 and an indoor unit 300. As illustrated in FIG. 1, a compressor 203, a heat source side heat exchanger 201, a supercooling heat exchanger 204, a pressure reducing valve 303, and a use side heat exchanger 301 are connected to a refrigerant mainstream circuit.

In the bypass example 1, a supercooling bypass expansion valve 205 is provided in a bypass circuit connected from piping between the heat source side heat exchanger 201 and the supercooling heat exchanger 204 to piping on a suction side of the compressor 203. The supercooling heat exchanger 204 is a heat exchanger that exchanges heat between refrigerant that has passed through the supercooling bypass expansion valve 205 provided in the bypass circuit connected to the piping on the suction side of the compressor 203 from a position between the heat source side heat exchanger 201 and the supercooling heat exchanger 204, and refrigerant in the mainstream circuit.

<Outdoor Unit>

In the outdoor unit 200, the compressor 203 in which the number of rotations is variable or fixed, the heat source side heat exchanger 201, and the supercooling heat exchanger 204 are connected to the piping. Additionally, the outdoor unit 200 includes an outdoor fan 202 that sends air to the heat source side heat exchanger 201.

The outdoor unit 200 includes various sensors. Specifically, the outdoor unit 200 includes a temperature sensor 208 that detects the outdoor temperature, a temperature sensor 209 that detects the compressor inlet temperature, a temperature sensor 210 that detects the condenser inlet refrigerant temperature (the compressor outlet pressure), and a temperature sensor 211 that detects the condenser outlet refrigerant temperature.

Additionally, the outdoor unit 200 includes a sensor 212 that detects the compressor inlet pressure and a sensor 213 that detects the condenser pressure.

<Indoor Unit>

In the indoor unit 300, the use side heat exchanger 301 that exchanges heat with indoor air and the pressure reducing valve 303 for adjusting the refrigerant flow rate of the use side heat exchanger 301 are connected to the piping. Additionally, the indoor unit 300 includes an indoor fan 302 that sends air to the use side heat exchanger 301.

The indoor unit 300 includes various sensors. Specifically, the indoor unit 300 includes a temperature sensor 304 that detects the indoor temperature, a temperature sensor 305 that detects the evaporator inlet refrigerant temperature, and a temperature sensor 306 that detects the evaporator outlet refrigerant temperature.

<Control Device>

A control device 400 is a device that controls the air conditioner 100 and infers the refrigerant amount. Specifically, the control device 400 includes a controller 401 that controls the air conditioner 100, a refrigerant amount inference unit 402 that infers the refrigerant amount, and a training data storage unit 403 that stores training data. The control device 400 may function as the controller 401 and the refrigerant amount inference unit 402 by executing a program. The refrigerant amount inference unit 402 and the training data storage unit 403 are also referred to as a refrigerant amount inference apparatus. The control device 400 will be described in detail below with reference to FIGS. 3 to 5.

Here, the control device 400 may be built into the air conditioner 100. Alternatively, a portion of the control device 400 (e.g., the refrigerant amount inference unit 402 and the training data storage unit 403) or an entirety of the control device 400 may be implemented on a device (e.g., a cloud server) that is separate from the air conditioner 100.

<Overall Configuration (a Bypass Example 2)>

Figure 2:
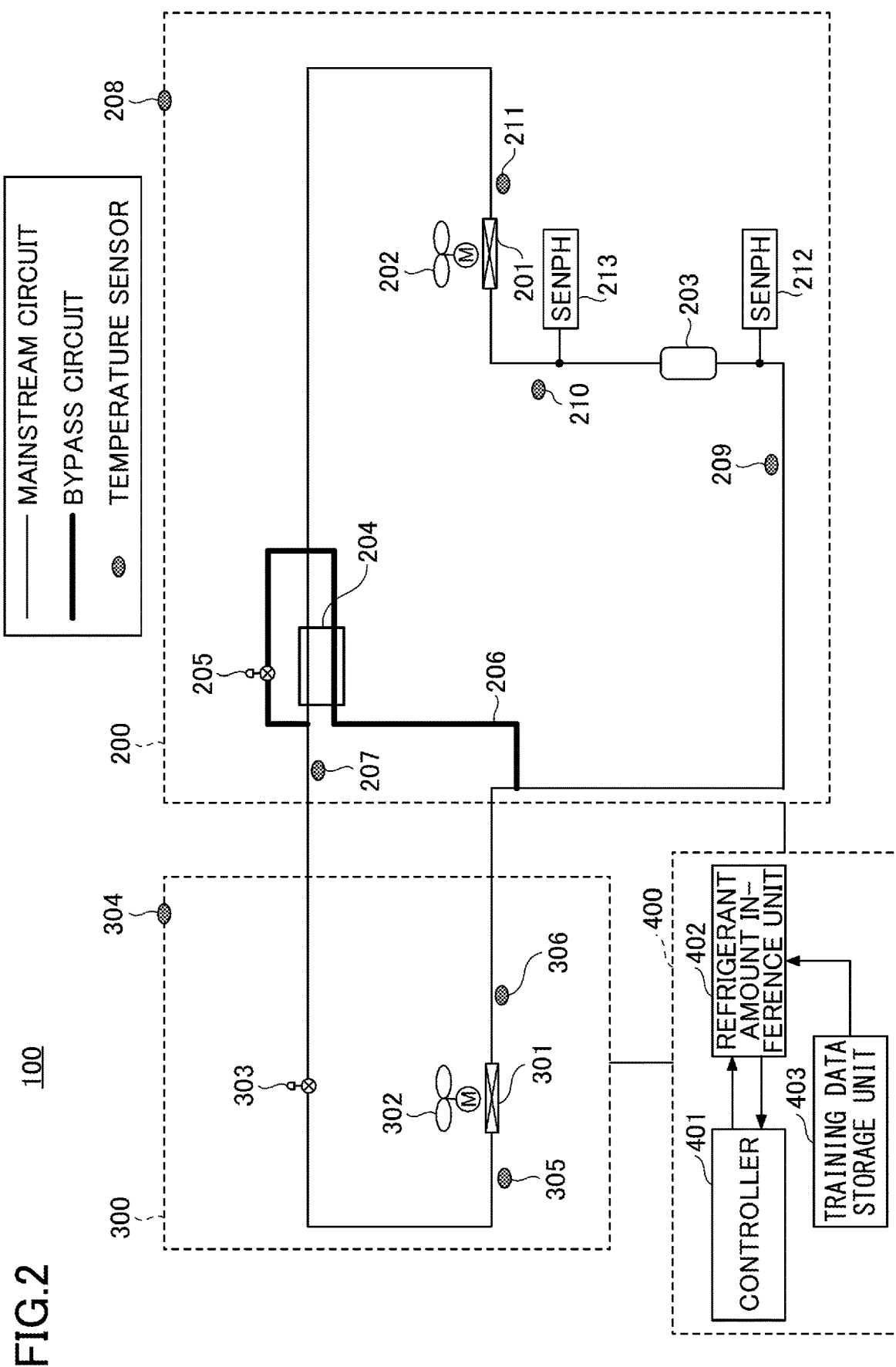
FIG. 2 is a diagram illustrating an overall configuration according to one embodiment of the present disclosure.

FIG. 2 is a diagram illustrating the overall configuration (a bypass example 2) according to one embodiment of the present disclosure. The air conditioner 100 includes the outdoor unit 200 and the indoor unit 300. As illustrated in FIG. 2, the compressor 203, the heat source side heat exchanger 201, the supercooling heat exchanger 204, the pressure reducing valve 303, and the use side heat exchanger 301 are connected to the refrigerant mainstream circuit. In the following, points that differ from the bypass example 1 will be mainly described.

In the bypass example 2, the supercooling bypass expansion valve 205 is provided in a bypass circuit connected from piping between the pressure reducing valve 303 and the supercooling heat exchanger 204 to the piping on a suction side of the compressor 203. The supercooling heat exchanger 204 is a heat exchanger that exchanges heat between refrigerant that passes through the supercooling bypass expansion valve 205 provided in a bypass circuit connected from a position between the pressure reducing valve 303 and the supercooling heat exchanger 204 to piping on the suction side of the compressor 203, and the refrigerant in the mainstream circuit.

<Hardware Configuration of the Control Device 400>

Figure 3:
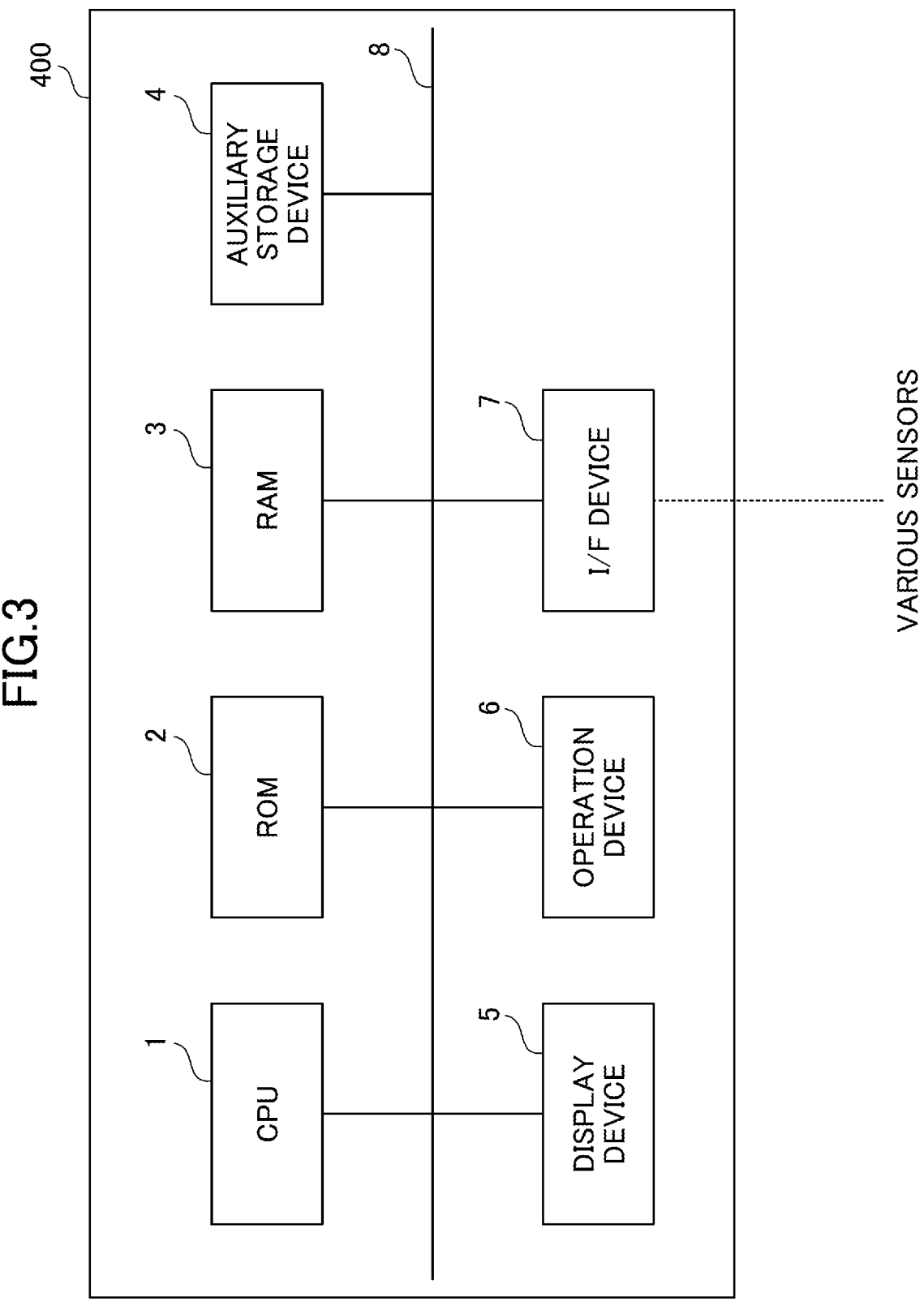
FIG. 3 is a hardware configuration diagram of a control device according to one embodiment of the present disclosure.

FIG. 3 is a hardware configuration diagram of the control device 400 according to one embodiment of the present disclosure. The control device 400 includes a central processing unit (CPU) 1, a read only memory (ROM) 2, and random access memory (RAM) 3. The CPU 1, the ROM 2, and the RAM 3 form what is called a computer.

Additionally, the control device 400 includes an auxiliary storage device 4, a display device 5, an operation device 6, and an interface (I/F) device 7. The hardware components of the control device 400 are connected to one another via a bus 8.

The CPU 1 is an arithmetic device that executes various programs installed in the auxiliary storage device 4.

The ROM 2 is a non-volatile memory. The ROM 2 functions as a main storage device that stores various programs, data, and the like necessary for the CPU 1 to execute various programs installed in the auxiliary storage device 4. Specifically, the ROM 2 functions as a main storage device that stores a boot program such as basic input/output system (BIOS), an extensible firmware interface (EFI), or the like.

The RAM 3 is a volatile memory such as a dynamic random access memory (DRAM) or a static random access memory (SRAM). The RAM 3 functions as a main storage device that provides a workspace in which various programs installed in the auxiliary storage device 4 are deployed when the various programs are executed by the CPU 1.

The auxiliary storage device 4 is an auxiliary storage device that stores various programs and information used when the various programs are executed. The training data storage unit 403 is implemented in the auxiliary storage device 4.

The display device 5 is a display device that displays an internal state of the control device 400 and the like.

The operation device 6 is an input device used by an administrator of the control device 400 to input various instructions to the control device 400.

The I/F device 7 is a communication device that connects to various sensors and a network and communicates with another terminal.

Figure 4:
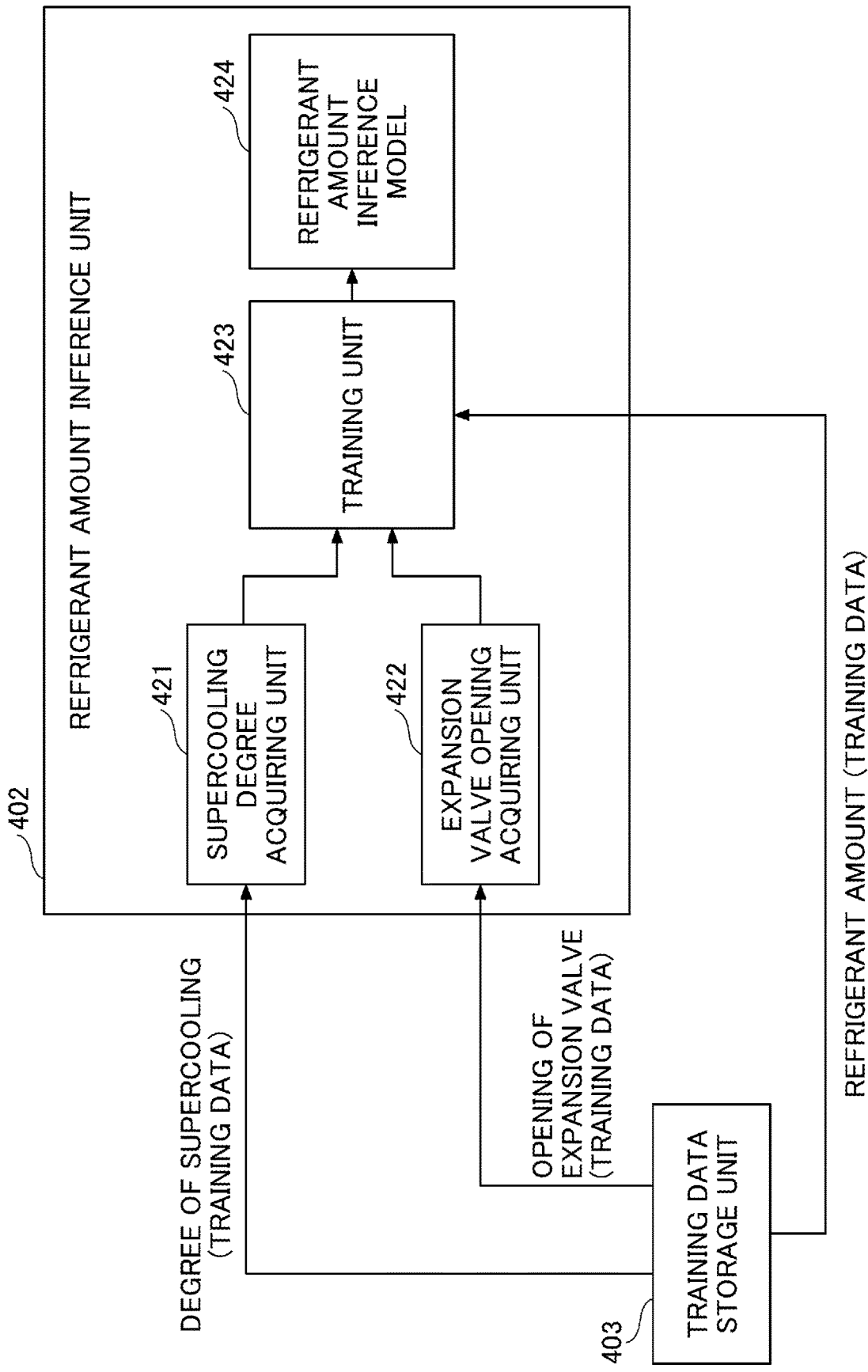
FIG. 4 is a functional block diagram of the control device according to one embodiment of the present disclosure (a training phase)

FIG. 4 is a functional block diagram (a training phase) of the control device according to one embodiment of the present disclosure.

A supercooling degree acquiring unit 421 acquires, from the training data storage unit 403, a state of the refrigerant (for example, the degree of supercooling acquired by the temperature sensor 207) in the piping between the pressure reducing valve 303 of the air conditioner 100 and the supercooling heat exchanger 204 (hereinafter, referred to as first piping).

An expansion valve opening acquiring unit 422 acquires, from the training data storage unit 403, an operation amount (for example, the degree of the opening of the supercooling bypass expansion valve 205) related to the state of the refrigerant in the first piping.

The training unit 423 associates the state of the refrigerant in the first piping and the operation amount related to the state of the refrigerant in the first piping with the refrigerant amount (training data) acquired from the training data storage unit 403 to perform machine learning. The training unit 423 generates a refrigerant amount inference model 424 that can derive the refrigerant amount from the state of the refrigerant in the first piping and the operation amount related to the state of the refrigerant in the first piping by performing machine learning.

Here, the training data stored in the training data storage unit 403 is initial data at the time of installation of the air conditioner 100 or design data at the time of development of the air conditioner 100. That is, the training data stored in the training data storage unit 403 is the refrigerant amount (for example, an appropriate amount of refrigerant), the state of the refrigerant in the first piping at that time, and the operation amount related to the state of the refrigerant in the first piping at that time.

The state of the refrigerant in the first piping is, for example, a value of the degree of supercooling detected by the temperature sensor 207 of the supercooling heat exchanger outlet temperature. The value of the degree of supercooling is a current value or both the current value and a pre-change value. The pre-change value is a value obtained before the operation related to the state of the refrigerant in the first piping (e.g., an adjustment of the opening of the supercooling bypass expansion valve 205) is performed.

The operation amount related to the state of the refrigerant in the first piping is, for example, the operation amount (e.g., the degree of the opening) of the supercooling bypass expansion valve 205. The operation amount is a current value or both the current value and a pre-change value. The pre-change value is a value obtained before the operation (e.g., an adjustment of the opening of the supercooling bypass expansion valve 205) related to the state of the refrigerant in the first piping is performed.

In addition to the above-described "the state of the refrigerant in the first piping and the operation amount related to the state of the refrigerant in the first piping", the training unit 423 may be configured to further input a condenser refrigerant state and the operation amount related to the condenser refrigerant state to perform training.

The condenser refrigerant state may include, for example, the condenser inlet refrigerant temperature acquired by the temperature sensor 210, the condenser outlet refrigerant temperature acquired by the temperature sensor 211, the condenser pressure acquired by the sensor 213, and the outside air temperature acquired by the temperature sensor 208. The operation amount related to the condenser refrigerant state may include, for example, the number of rotations of the fan 202, and the circulation amount. Each value is a current value or both the current value and a pre-change value. The pre-change value is a value obtained before the operation related to the state of the refrigerant in the first piping (e.g., an adjustment of the opening of the supercooling bypass expansion valve 205) is performed.

The circulation amount is calculated from the number of rotations of the compressor 203, the compressor inlet/outlet pressure acquired by the sensors 212 and 213, and the compressor inlet/outlet temperature acquired by the temperature sensors 209 and 210.

In addition to the above-described "the state of the refrigerant in the first piping and the operation amount related to the state of the refrigerant in the first piping", the training unit 423 may be configured to further input an evaporator refrigerant state and the operation amount related to the evaporator refrigerant state to perform training.

The evaporator refrigerant state may include, for example, the evaporator inlet refrigerant temperature acquired by the temperature sensor 305, the evaporator outlet refrigerant temperature acquired by the temperature sensor 306, the evaporator pressure, the room temperature acquired by the temperature sensor 304, the indoor unit connection capacity, and the indoor unit connection model. The operation amount related to the evaporator refrigerant state may include, for example, the operation amount (e.g., the degree of the opening) of the pressure reducing valve 303 and the indoor air flow volume. Each value is a current value or both the current value and a pre-change value. The pre-change value is a value before the operation (e.g., an adjustment of the opening of the supercooling bypass expansion valve 205) related to the state of the refrigerant in the first piping is performed.

Here, the evaporator pressure is calculated from the evaporator inlet refrigerant temperature.

As described, in addition to "the state of the refrigerant in the first piping and the operation amount related to the state of the refrigerant in the first piping", "the condenser refrigerant state and the operation amount related to the condenser refrigerant state or the evaporator refrigerant state and the operation amount related to the evaporator refrigerant state" can be used to improve the accuracy of the inference of the refrigerant amount.

Figure 5:
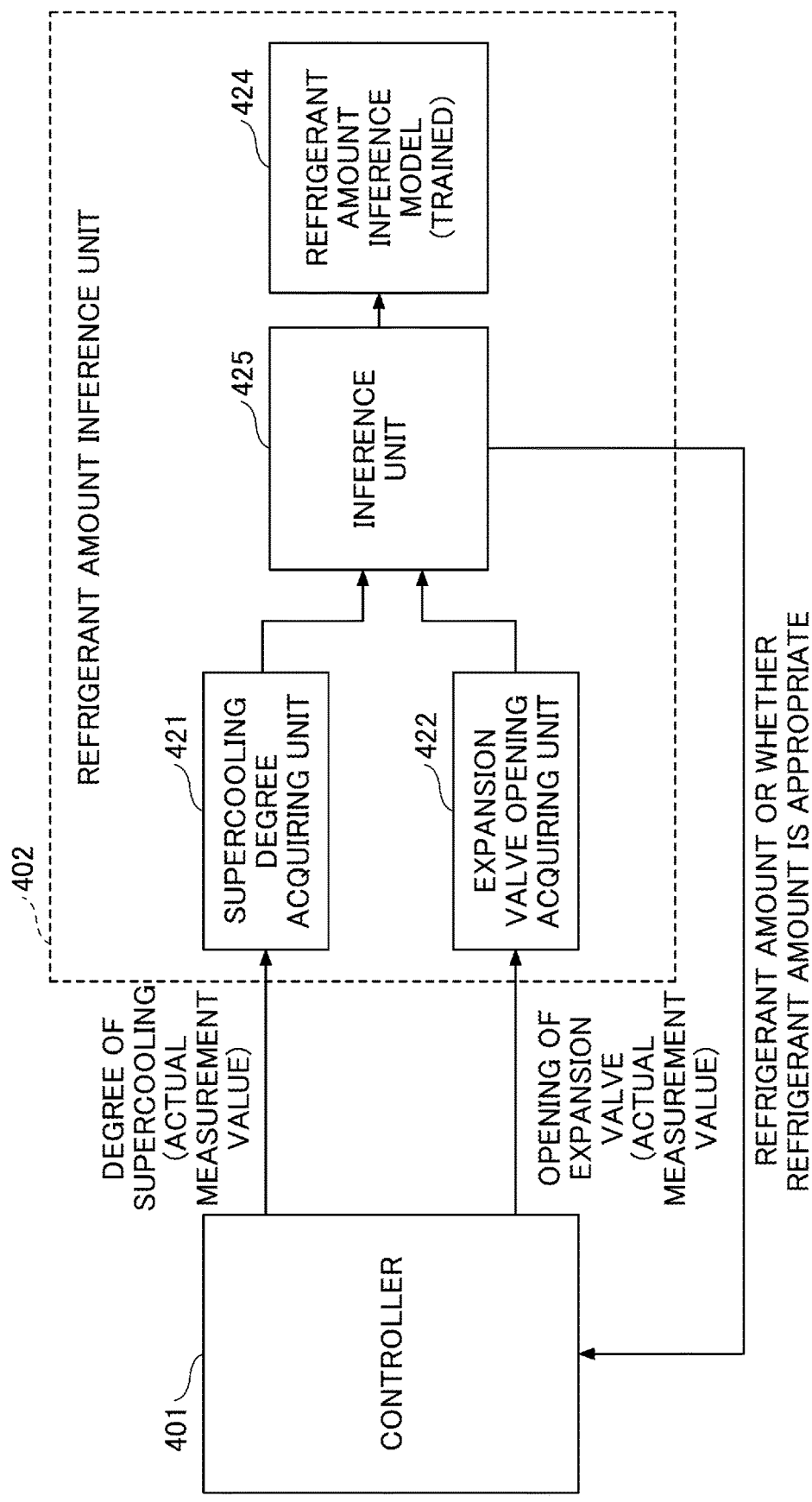
FIG. 5 is a functional block diagram of the control device according to one embodiment of the present disclosure (an inference phase)

FIG. 5 is a functional block diagram (an inference phase) of the control device 400 according to one embodiment of the present disclosure.

The supercooling degree acquiring unit 421 acquires, from the controller 401, the state of the refrigerant in the piping (the first piping) between the pressure reducing valve 303 of the air conditioner 100 and the supercooling heat exchanger 204 (for example, the degree of supercooling acquired by the temperature sensor 207).

The expansion valve opening acquiring unit 422 acquires, from the controller 401, the operation amount (for example, the degree of the opening of the supercooling bypass expansion valve 205) related to the state of the refrigerant in the first piping.

An inference unit 425 infers the refrigerant amount by inputting, into the refrigerant amount inference model 424 that has been trained by the training unit 423, the state of the refrigerant in the first piping and the operation amount related to the state of the refrigerant in the first piping. The inference unit 425 notifies the controller 401 of the inferred refrigerant amount.

Here, the inference unit 425 may be configured to infer the refrigerant amount in question or may be configured to infer whether the refrigerant amount is appropriate (that is, whether there is an excess or an insufficient amount of refrigerant).

In the following, a case of inferring whether there is an excess or an insufficient amount of refrigerant will be described. The inference unit 425 may compare the inferred refrigerant amount with a predetermined threshold value (e.g., an appropriate amount of refrigerant determined for each model of the air conditioner 100) to infer whether there is an excess or an insufficient amount of refrigerant. Alternatively, the inference unit 425 may assume that there is an excess amount of the refrigerant if the inferred refrigerant amount exceeds a predetermined upper limit value, and may assume that there is an insufficient amount of the refrigerant if the inferred refrigerant amount is less than a predetermined lower limit value.

FIG. 6 is a diagram for explaining the correspondence between the state of the refrigerant and the operation amount related to the state of the refrigerant; and the refrigerant amount, according to one embodiment of the present disclosure. As illustrated in FIG. 6, the state of the refrigerant in the first piping (e.g., the degree of supercooling) and the operation amount related to the amount of the refrigerant in the first piping (e.g., the operation amount of the supercooling bypass expansion valve 205); and the refrigerant amount are associated with one another. Therefore, for example, if the degree of supercooling changes with the same operation amount, it indicates that the refrigerant amount changes, and thus the refrigerant amount can be inferred.

Figure 7:
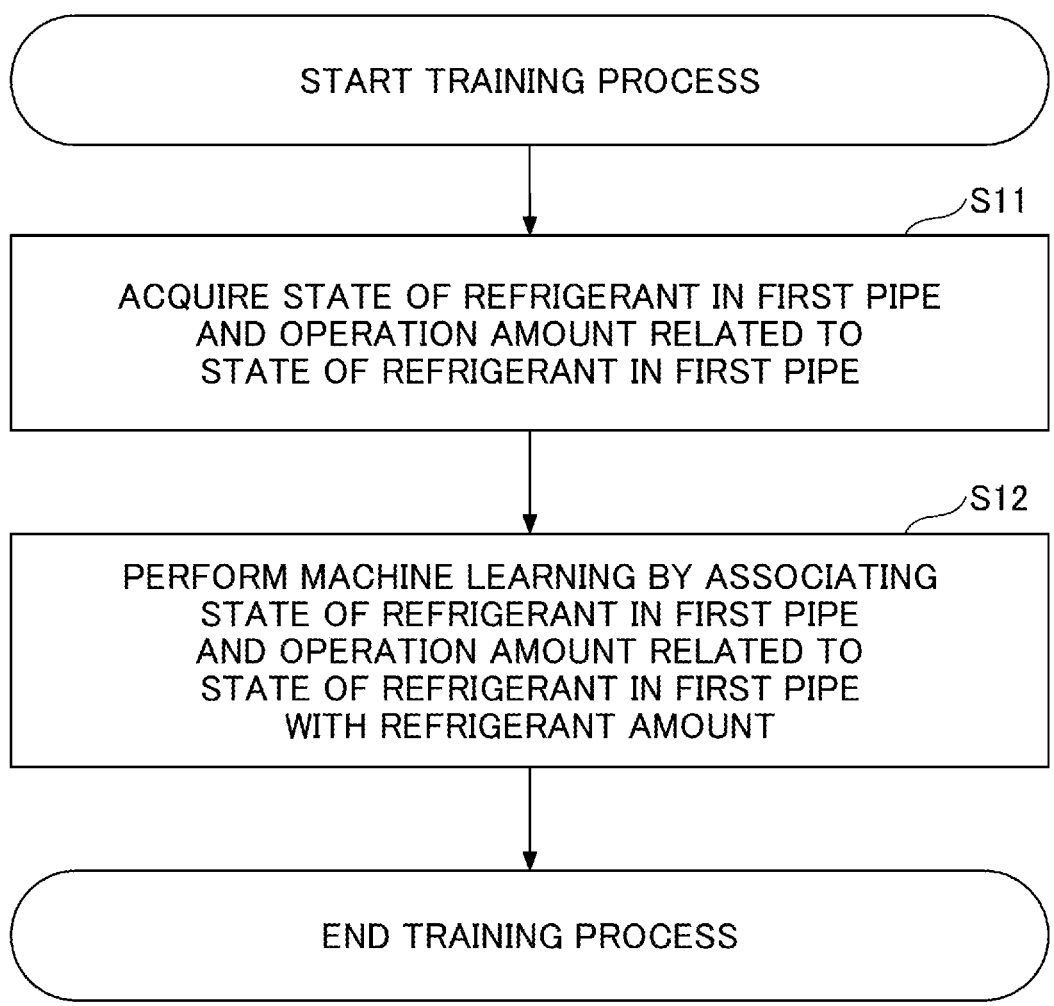
FIG. 7 is a flowchart of a training process according to one embodiment of the present disclosure.

FIG. 7 is a flowchart of a training process according to one embodiment of the present disclosure.

In step 11 (S11), the training unit 423 acquires the state of the refrigerant in the first piping (training data) and the operation amount related to the state of the refrigerant in the first piping (training data).

In step 12 (S12), the training unit 423 performs machine learning by associating the state of the refrigerant in the first piping (training data), the operation amount related to the state of the refrigerant in the first piping (training data) both acquired in S11 with the refrigerant amount (training data).

FIG. 8 is a flowchart of an inference process according to one embodiment of the present disclosure.

In step 21 (S21), the inference unit 425 acquires a state of the refrigerant in the first piping (an actual measurement value) and an operation amount related to the state of the refrigerant in the first piping (an actual measurement value).

In step 22 (S22), the inference unit 425 infers the refrigerant amount in question or infers whether the refrigerant amount is appropriate from the state of the refrigerant in the first piping (the actual measurement value) and the operation amount related to the state of the refrigerant in the first piping (the actual measurement value) both acquired in S21, based on a result of the training of S12 in FIG. 7.

Although the embodiments have been described above, it will be understood that various modifications of the form and details may be made without departing from the subject matter and scope of the claims.

This application is based upon claims the priority to Japanese Application No. 2019-052020, filed Mar. 19, 2019, submitted to the Japan Patent Office, the entirety of which is incorporated herein by reference.

DESCRIPTION OF THE REFERENCE NUMERALS

100 air conditioner
200 outdoor unit
201 heat source side heat exchanger
202 outdoor fan
203 compressor
204 supercooling heat exchanger
205 supercooling bypass expansion valve
206 bypass circuit 207 supercooling heat exchanger outlet temperature sensor
208 outdoor air temperature sensor
209 compressor inlet temperature sensor
210 condenser inlet refrigerant temperature (compressor outlet pressure) sensor
211 condenser outlet refrigerant temperature sensor
212 compressor inlet pressure sensor
213 condenser pressure sensor
300 indoor unit
301 use side heat exchanger
302 indoor fan
303 pressure reducing valve
304 room temperature sensor
305 evaporator inlet refrigerant temperature sensor
306 evaporator outlet refrigerant temperature sensor
400 control device
401 controller
402 refrigerant amount inference unit
403 training data storage unit
421 supercooling degree acquiring unit
422 expansion valve opening acquiring unit
423 training unit
424 refrigerant amount inference model
425 inference unit

The invention claimed is:

1. A refrigerant amount inference apparatus that infers a target refrigerant amount in an air conditioner in which a compressor, a heat source side heat exchanger, a supercooling heat exchanger, a pressure reducing valve, and a use side heat exchanger are connected to piping, the supercooling heat exchanger being a heat exchanger that exchanges heat between refrigerant that passes through a supercooling bypass expansion valve provided in a bypass circuit and refrigerant in a mainstream circuit, the bypass circuit being connected to piping on a suction side of the compressor from a position between the heat source side heat exchanger and the supercooling heat exchanger or from a position between the pressure reducing valve and the supercooling heat exchanger, the refrigerant amount inference apparatus comprising:
a memory; and
a processor coupled to the memory and configured to:
acquire a state of refrigerant in first piping provided between the pressure reducing valve and the supercooling heat exchanger, an operation amount related to the state of the refrigerant in the first piping, a condenser refrigerant state, an operation amount related to the condenser refrigerant state, and a refrigerant amount from a training data storage unit storing training data; and
perform machine learning to generate an inference model by using the state of the refrigerant in the first piping, the operation amount related to the state of the refrigerant in the first piping, the condenser refrigerant state, the operation amount related to the condenser refrigerant state, and the refrigerant amount as the training data, so that the inference model outputs the refrigerant amount in response to the state of the refrigerant in the first piping, the operation amount related to the state of the refrigerant in the first piping, the condenser refrigerant state, and the operation amount related to the condenser refrigerant state being input into the inference model.

2. The refrigerant amount inference apparatus as claimed in claim 1, the processor is further configured to infer the target refrigerant amount from a state of the refrigerant in the first piping and an operation amount related to the state of the refrigerant in the first piping, based on a result of the machine learning.

3. The refrigerant amount inference apparatus as claimed iii claim 1, the processor is further configured to infer whether the target refrigerant amount is appropriate, from a state of the refrigerant in the first piping and an operation amount related to the state of the refrigerant in the first piping, based on a result of the machine learning.

4. The refrigerant amount inference apparatus as claimed in claim 1,
wherein the state of the refrigerant in the first piping is a current value of a degree of supercooling, or the current value and a pre-change value of the degree of supercooling, and
wherein the operation amount related to the state of the refrigerant in the first piping is a current value of an operation amount of the supercooling bypass expansion valve or is the current value and a pre-change value of the operation amount of the supercooling bypass expansion valve.

5. The refrigerant amount inference apparatus as claimed in claim 1, wherein the state of the refrigerant in the first piping, the operation amount related to the state of the refrigerant in the first piping, and the refrigerant amount are initial data at time of installation of the air conditioner or design data at time of development of the air conditioner.

6. A method performed by a computer that infers a target refrigerant amount in an air conditioner in which a compressor, a heat source side heat exchanger, a supercooling heat exchanger, a pressure reducing valve, and a use side heat exchanger are connected to piping, the supercooling heat exchanger being a heat exchanger that exchanges heat between refrigerant that passes through a supercooling bypass expansion valve provided in a bypass circuit and refrigerant in a mainstream circuit, the bypass circuit being connected to piping on a suction side of the compressor from a position between the heat source side heat exchanger and the supercooling heat exchanger or from a position between the pressure reducing valve and the supercooling heat exchanger, the method comprising:
acquiring a state of refrigerant in first piping provided between the pressure reducing valve and the supercooling heat exchanger, an operation amount related to the state of the refrigerant in the first piping, an evaporator refrigerant state and an operation amount related to the evaporator refrigerant state, and a refrigerant amount from a training data storage unit storing training data; and
performing machine learning to generate an inference model by using the state of the refrigerant in the first piping, the operation amount related to the state of the refrigerant in the first piping, the evaporator refrigerant state, the operation amount related to the evaporator refrigerant state, and the refrigerant amount as the training data, so that the inference model outputs the refrigerant amount in response to the state of the refrigerant in the first piping, the operation amount related to the state of the refrigerant in the first piping, the evaporator refrigerant state, and the operation amount related to the evaporator refrigerant state being input into the inference model.

7. A refrigerant amount inference apparatus that infers a target refrigerant amount in an air conditioner in which a compressor, a heat source side heat exchanger, a supercooling heat exchanger, a pressure reducing valve, and a use side heat exchanger are connected to piping, the supercooling heat exchanger being a heat exchanger that exchanges heat between refrigerant that passes through a supercooling bypass expansion valve provided in a bypass circuit and refrigerant in a mainstream circuit, the bypass circuit being connected to piping on a suction side of the compressor from a position between the heat source side heat exchanger and the supercooling heat exchanger or from a position between the pressure reducing valve and the supercooling heat exchanger, the refrigerant amount inference apparatus comprising:

a memory; and a processor coupled to the memory and configured to:

acquire a state of refrigerant in first piping provided between the pressure reducing valve and the supercooling heat exchanger, an operation amount related to the state of the refrigerant in the first piping, an evaporator refrigerant state, an operation amount related to the evaporator refrigerant state, and a refrigerant amount from a training data storage unit storing training data; and perform machine learning to generate an inference model by using the state of the refrigerant in the first piping, the operation amount related to the state of the refrigerant in the first piping, the evaporator refrigerant state, the operation amount related to the evaporator refrigerant state and the refrigerant amount as the training data, so that the inference model outputs the refrigerant amount in response to the state of the refrigerant in the first piping, the operation amount related to the state of the refrigerant in the first piping, the evaporator refrigerant state, and the operation amount related to the evaporator refrigerant state being input into the inference model.

\* \* \* \* \*